United States Patent
Miyahira et al.

(10) Patent No.: US 7,136,806 B2
(45) Date of Patent: Nov. 14, 2006

(54) SENTENCE SEGMENTATION METHOD AND SENTENCE SEGMENTATION APPARATUS, MACHINE TRANSLATION SYSTEM, AND PROGRAM PRODUCT USING SENTENCE SEGMENTATION METHOD

(75) Inventors: Tomohiro Miyahira, Yamato (JP); Yoshiroh Kamiyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 10/223,502

(22) Filed: Aug. 19, 2002

(65) Prior Publication Data

US 2003/0055626 A1    Mar. 20, 2003

(30) Foreign Application Priority Data

Sep. 19, 2001    (JP)    ............... 2001-284488

(51) Int. Cl.
*G06F 17/27* (2006.01)
(52) U.S. Cl. .......................................................... 704/9
(58) Field of Classification Search .................. None
See application file for complete search history.

(56) References Cited

U.S. PATENT DOCUMENTS

| | | | | |
|---|---|---|---|---|
| 5,001,633 A | * | 3/1991 | Fukumochi et al. | 704/6 |
| 5,479,563 A | * | 12/1995 | Yamaguchi | 704/232 |
| 5,671,425 A | * | 9/1997 | Suematsu | 704/9 |
| 5,892,842 A | * | 4/1999 | Bloomberg | 382/173 |

FOREIGN PATENT DOCUMENTS

JP    63-256637    4/1990

OTHER PUBLICATIONS

Palmer et al., "Adaptive multilingual sentence boundary disambiguation", Computational Linguistics, vol. 23, Issue 2, Jun. 1997, pp. 241-267.*
Mikheev, "Tagging sentence boundaries", Proceedings of the first conference on North American chapter of the Association for Computational Linguistics, Seattle, Washington, Apr. 2000, pp. 264-271.*
Palmer et al., "Text processing: Adaptive sentence boundary disambiguation", Proceedings of the fourth conference on Applied natural language processing, Stuttgart, Germany, Oct. 1994, pp. 78-83.*
Stevenson et al., "Experiments on sentence boundary detection", Proceedings of the sixth conference on Applied natural language processing, Seattle, Washington, Apr. 2000, pp. 84-89.*
Reynar et al., "A maximum entropy approach to identifying sentence boundaries", Proceedings of the Fifth Conference on Applied Natural Language Processing, Washington, DC, Mar. 31-Apr. 3, 1997, pp. 16-19.*
Yeh et al., "Some properties of preposition and subordinate conjunction attachments", Proceedings of the 17th international conference on Computational linguistics—vol. 2, Montreal, Quebec, Canada, Aug. 1998, pp. 1436-1442.*

* cited by examiner

*Primary Examiner*—David Hudspeth
*Assistant Examiner*—Brian Albertalli
(74) *Attorney, Agent, or Firm*—Akerman Senterfitt

(57) ABSTRACT

To provide a highly accurate sentence segmentation process in natural language processing by estimating parts of speech of words in text to be processed. Dictionary data is used to perform a sentence segmentation process on a text to be processed. If it cannot be determined through a user of the dictionary data whether the text should be broken into sentences, the parts of speech of words constituting the text are estimated and a further sentence segmentation process is performed based on the result of the estimation.

8 Claims, 6 Drawing Sheets

[Figure 1]
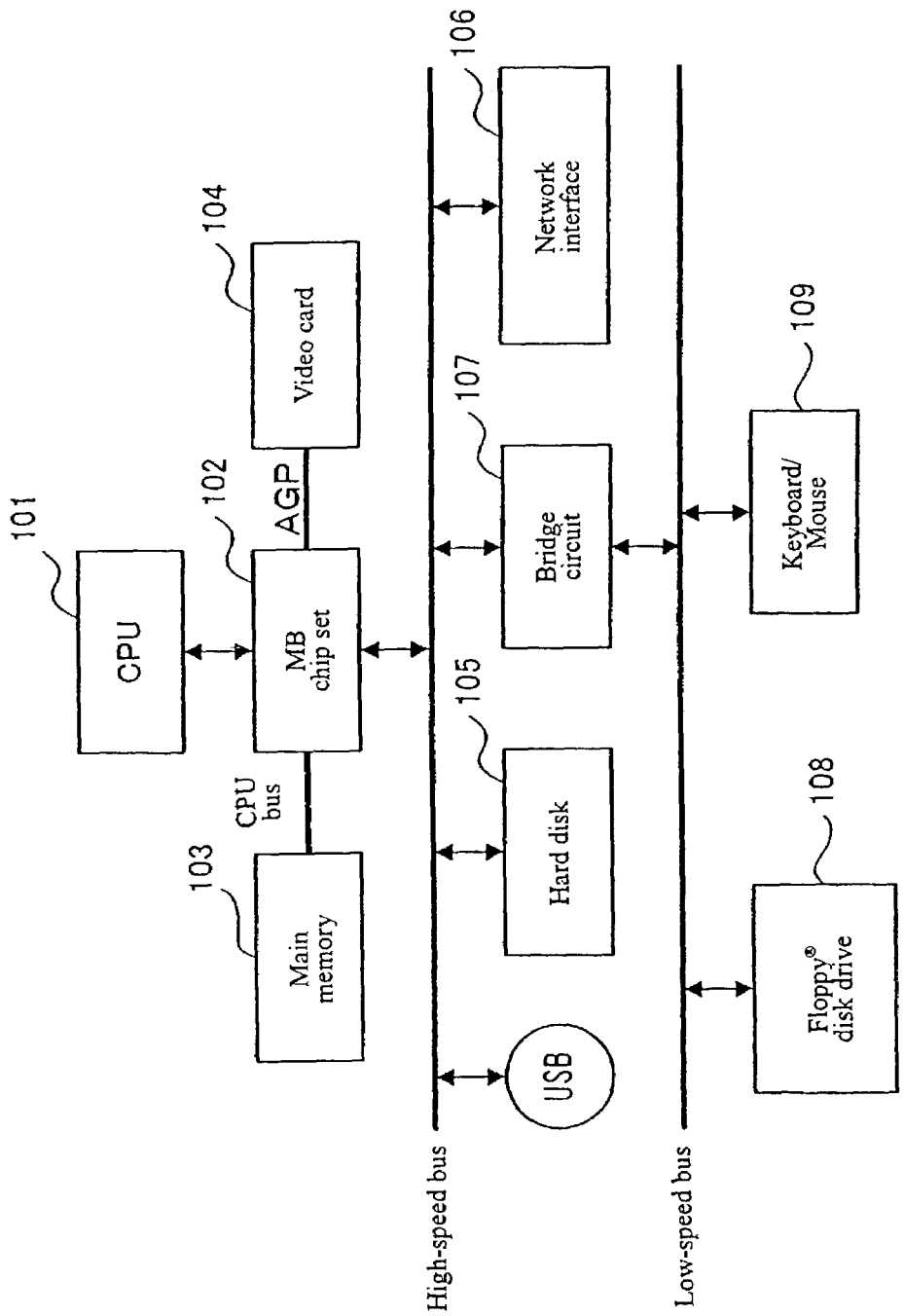

[Figure 2]
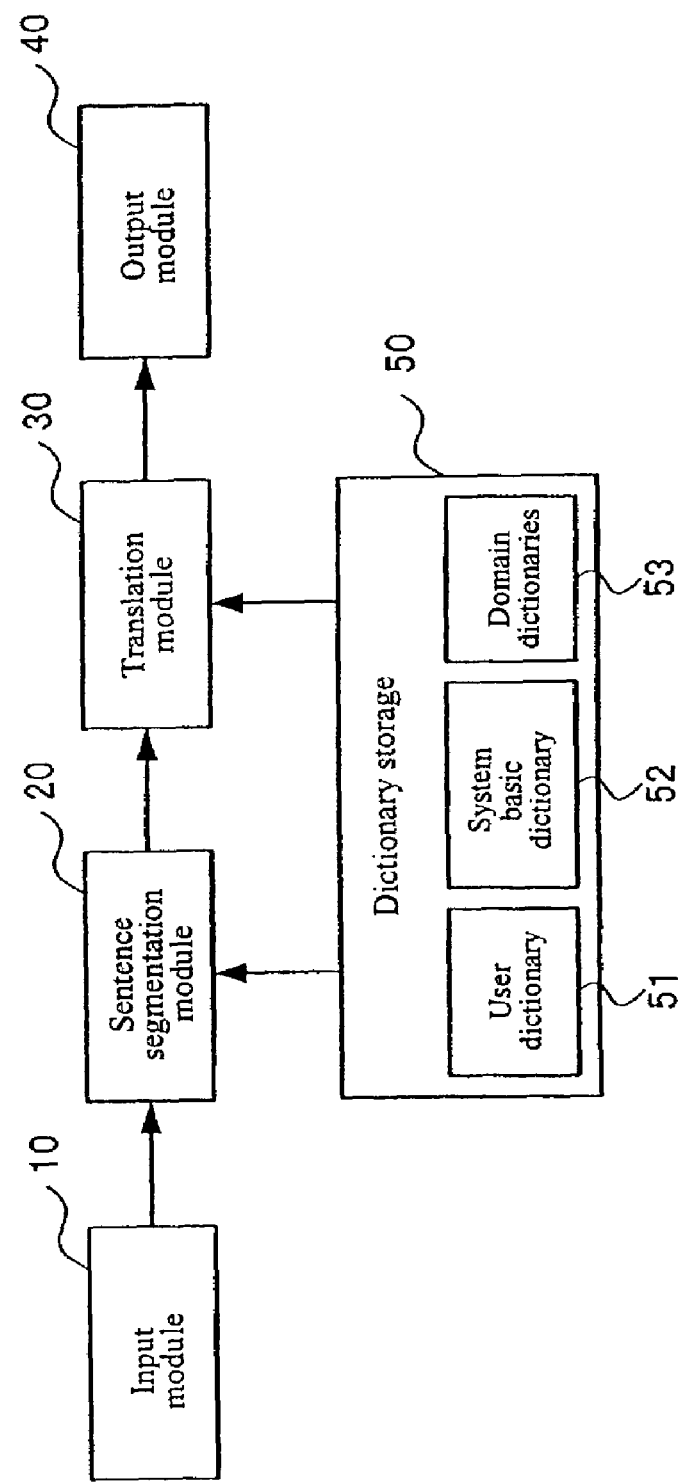

[Figure 3]
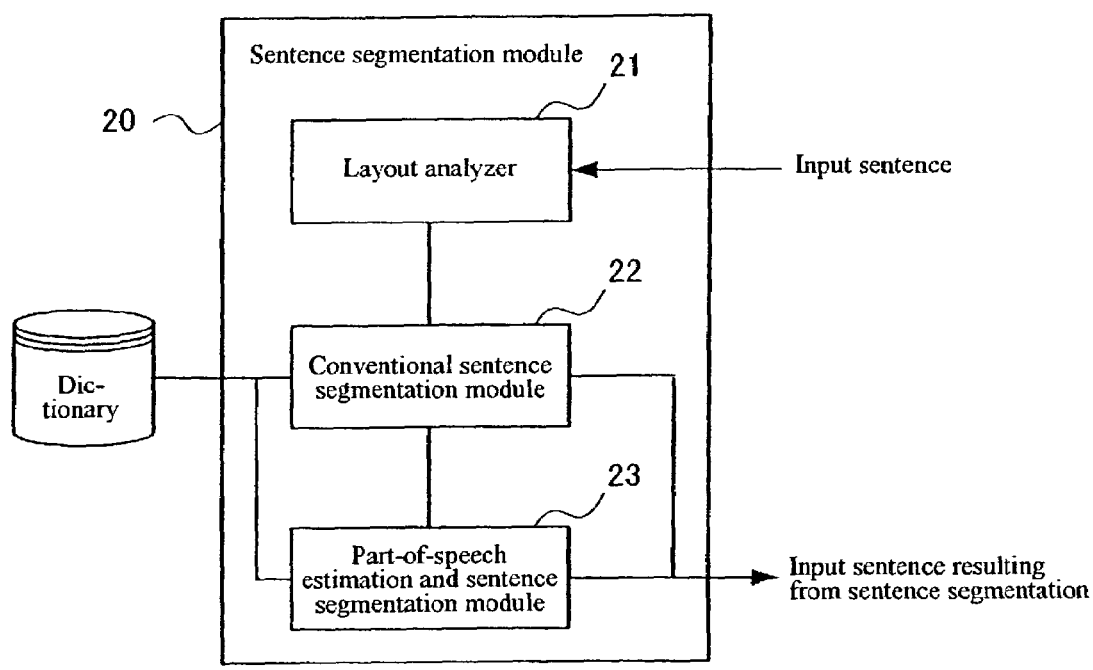

[Figure 4]
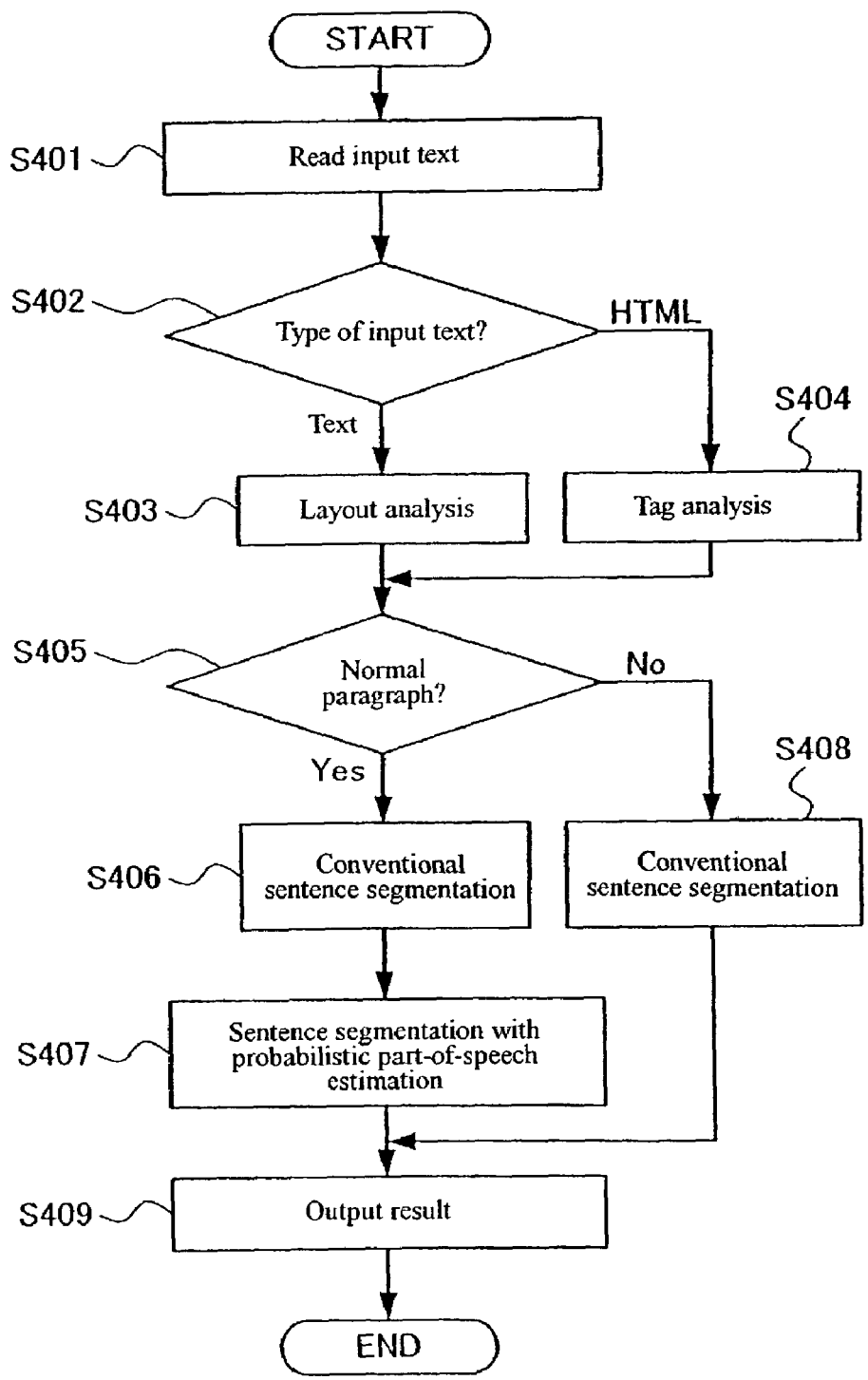

[Figure 5]
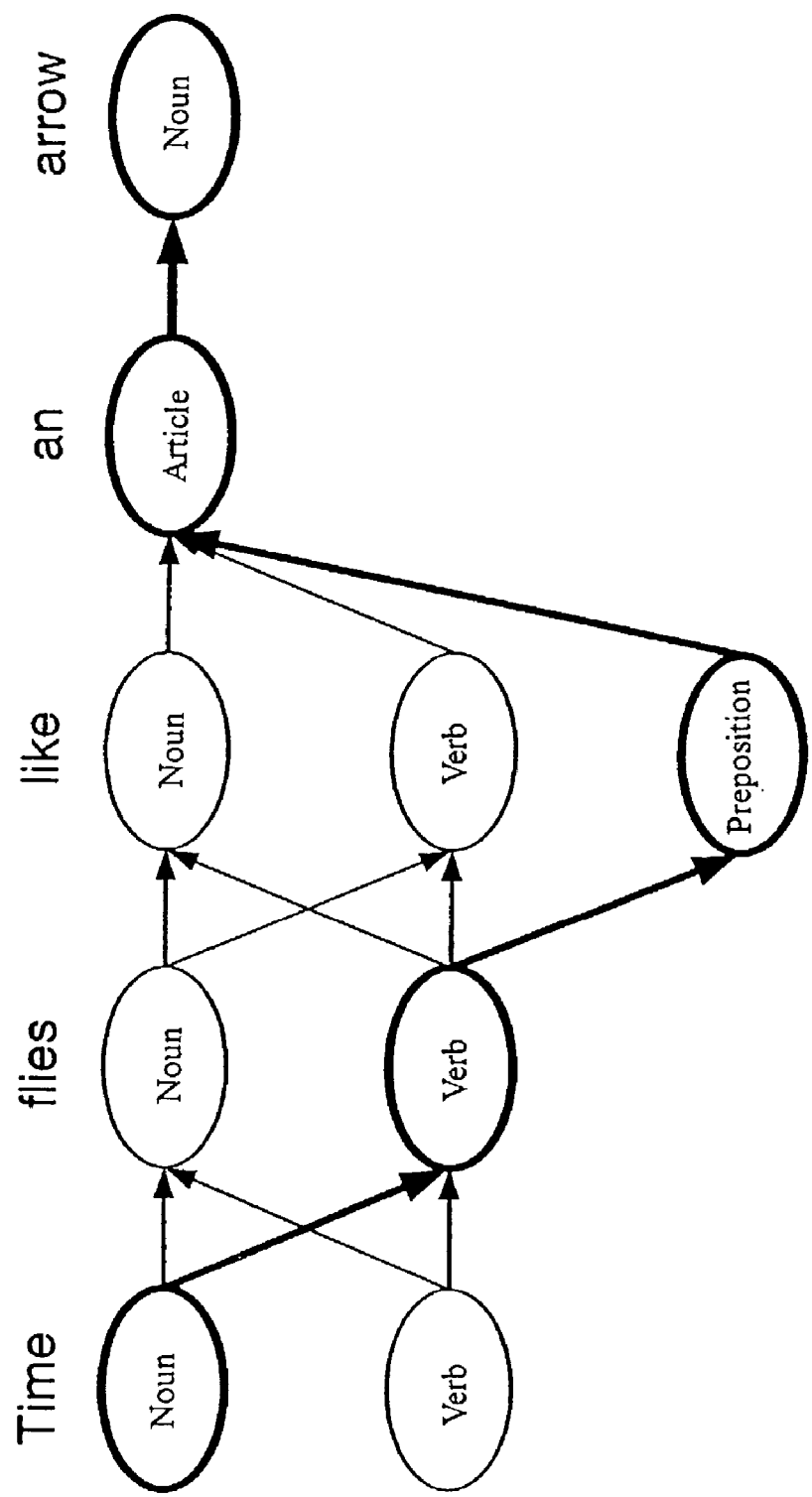

[Figure 6]

|  | Process 1 | Process 2 | Conventional method | Number of samples |
|---|---|---|---|---|
| To be broken | 30 | 27 | 30 | 30 |
| Not to be broken | 136 | 127 | 0 | 149 |
| Total | 169 | 154 | 30 | 179 |

SENTENCE SEGMENTATION METHOD AND SENTENCE SEGMENTATION APPARATUS, MACHINE TRANSLATION SYSTEM, AND PROGRAM PRODUCT USING SENTENCE SEGMENTATION METHOD

CROSS-REFERENCE TO RELATED APPLICATIONS

This application claims the benefit of Japanese Application No. 2001-284488 filed Sep. 19, 2001 at the Japanese Patent Office.

BACKGROUND OF THE INVENTION

1. Technical Field

The present invention relates to natural language analysis performed in areas such as machine translation, and, in particular, to a process for breaking text into sentences.

2. Description of the Related Art

The first process to be performed in natural language processing in a field such as machine translation is to break text into sentences. Sentence segmentation is a process for breaking text in a natural language to be processed into sentences. The individual sentence resulting from this sentence segmentation process is used as a unit to perform a desired process such as translation. If text is broken at an improper point, the desired process such as translation cannot properly be accomplished. In machine translation, a long source sentence may explosively increase the amount of data to be processed. If text that should be broken into two sentences is not broken, much time can be required for analyzing the sentence, which may result in a failure of the analysis.

In order to break text at a proper point, it is desirable that erroneous sentence segmentation be corrected based on understanding of the meaning of the text while the desired process such as translation is being performed. However, such correction cannot be made in today's level of natural language processing technology. Therefore, it is required that accurate sentence segmentation be performed in the initial stage.

If the processed language is English, sentences have periods at their ends and, as a general rule, text can be broken into sentences based on whether there is a period or not. However, a period may also be used as an abbreviation marker, in addition to the marker of the end of a sentence, and therefore, text may contain a word with a period (hereinafter called "period word(s)"), such as "U.S.". Consequently, it is not always a simple work to determine whether text can be broken into sentences.

Such a sentence segmentation procedure for English text according to prior art will be described below. Simple English text that contains no period words can be broken into sentences simply based on whether a word following a single period is capitalized. For example, consider the following text: "I have a pen. You have a book." Because "pen." cannot be a period word, the period following "pen" can be considered a single period indicating a sentence end. In addition, the word, "you", following it is capitalized. Therefore, the text is broken by this period.

Some period words, such as "Mr.", cannot appear at sentence ends. Other period words, such as "U.S.", can appear at sentence ends or at any midpoints of a sentence. These period words cannot be used as markers for determining sentence boundaries. Period words such as "Mr." that cannot appear at sentence ends are stored in a dictionary as data. The dictionary is referenced in a sentence segmentation process such that text is not broken immediately after such a word. On the other hand, a word such as "U.S." that cannot be used as a marker for determining a sentence boundary is not stored by itself, unlike words such as "Mr.". Instead, a word string, "U.S. President", for example, containing that word is stored in the dictionary. If a word string containing "U.S." used in text is not stored in the dictionary, the text is broken immediately after "U.S.". On the other hand, if the word string containing "U.S." is stored in the dictionary, the text is not broken immediately after "U.S.".

As described above, natural language analysis requires a highly accurate sentence segmentation in its preliminary stage. It is important that text that should be broken into two sentences be separated without fail and the possibility of breaking text that should be considered a single sentence into two sentences should be minimized.

If text to be processed is English text, how periods are treated is important in sentence segmentation. According to prior art, period words that cannot appear at sentence ends are stored in a dictionary and if a period in text is a part of a period word stored in the dictionary, the text is not broken by that period.

However, because the prior art provides no other criteria for making the determination, text containing a period word that can appear at both of any midpoints and the end of a sentence is mechanically broken by the period. Thus, there is a limit to improvement in the accuracy of the sentence segmentation in the prior art.

In addition, according to the prior art, word strings containing a word, such as "U.S." that does not indicate whether text should be broken immediately after it are stored in the dictionary and whether text should be broken is determined based on whether a word string containing the word in the text is stored in the dictionary. However, some passages of text should be broken immediately after a word string and others should not be broken immediately after that same word. Therefore, mechanical break determination may result in erroneous sentence segmentation. For example, the above-mentioned word string "U.S. President", which is seldom broken immediately after "U.S.", should be broken immediately after "U.S." in the following text in order to properly analyze the text: "Japanese Prime Minister Junichiro Koizumi went to U.S. President Bush welcomed him." In this case, there is the possibility that the text cannot be properly broken as to the case whether or not the word string "U.S. President" is stored in the dictionary.

SUMMARY OF THE INVENTION

An object of the present invention is to provide highly accurate sentence segmentation by estimating the parts of speech of words in text to be processed. To attain the object, the present invention provides a sentence segmentation method of using a computer to break text in a natural language into sentences, including the steps of: inputting the text to be processed, performing conventional sentence segmentation through the use of dictionary data stored in a dictionary storage, storing the text broken into sentences in memory, estimating the part of speech of a word constituting the text, and further performing sentence segmentation based on the result of the estimation.

In particular, the step of performing the sentence segmentation based on the result of the part-of-speech estimation includes the step of determining whether the text should be broken, depending on positional relationship between a word containing a period and a main verb (the verb of a main clause) in the text to be processed, the main verb being determined based on the result of the part-of-speech estimation.

In order to find the main verb, the method further includes the step of determining whether a verb should be treated as a main verb, based on positional relationship between a subordinate conjunction or a relative pronoun and the verb in the text to be processed. The method also comprises the step of determining that a verb following a conjunction "and" found at a point after the word containing the period is not a main verb.

Furthermore, the method includes the step of determining that the text should be broken immediately after the period if an article or pronoun is found immediately after the word containing the period in the text, regardless of the position of the main verb.

The present invention that attains the above-described object also provides a sentence segmentation method of using a computer to break text in natural language into sentences, including the steps of: inputting the text to be processed, estimating the part of speech of a word constituting the text, and storing the result of the part-of-speech estimation in memory; and if it is determined that there are verbs before and after a word containing a period in the text based on the estimation, breaking the text into sentences immediately after the period.

In particular, the part-of-speech estimation is performed by using a probabilistic method based on a corpus to which information about the parts of speech of words is added. Furthermore, the text to be processed is input, the layout of the text is analyzed, and obtained layout information is stored in memory; and part-of-speech estimation and sentence segmentation based on the result of said part-of-speech estimation are performed on text constituting an ordinary paragraph determined based on the layout information. The ordinary paragraph herein is a typical paragraph containing body text of a document, rather than text such as a title or list item that is used with a special layout.

The present invention also provides a sentence segmentation apparatus for performing a process for breaking text in natural language into sentences in natural language processing, including: a dictionary storage in which dictionary data is stored; a first sentence segmentation module for breaking the text input as a target of the processing into sentences based on the dictionary data; and a second sentence segmentation module for estimating the part of speech of a word constituting the text and breaking the text into sentences if the first sentence segmentation module cannot determine whether the text should be broken into sentences.

The second sentence segmentation module can determine based on positional relationship between a word containing a period and a main verb whether the text can be broken into sentences immediately after the period. The sentence segmentation apparatus further includes a layout analyzer for analyzing the layout of the text input as a target of the processing, wherein: the second sentence segmentation module performs sentence segmentation on text determined as constituting an ordinary paragraph based on the result of the analysis performed by the layout analyzer.

The present invention can be implemented as a machine translation apparatus for performing a process including the sentence segmentation using the part-of-speech estimation described above. The machine translation apparatus includes an input module for accepting input text to be processed; a sentence segmentation module for breaking the text into sentences, the text being input through the input module; a translation module for translating the text broken into sentences on a sentence basis; and an output module for outputting the result of translation, wherein: the sentence segmentation module estimates the part of speech of a word constituting the text to be processed and breaks the text based on the result of the part-of-speech estimation.

Furthermore, the present invention can be implemented as a program for performing the above-described sentence segmentation on a computer or causing a computer to function as the above-described sentence segmentation apparatus or machine translation apparatus. The program can be recorded on a magnetic disk, optical disk, semiconductor memory, or any other storage media and delivered or distributed over a network to provide to users.

BRIEF DESCRIPTION OF THE DRAWINGS

There are shown in the drawings embodiments which are presently preferred, it being understood, however, that the invention is not limited to the precise arrangements and instrumentalities shown.

FIG. 1 shows a block diagram of an exemplary hardware configuration of a computer system suitable for implementing a machine translation system according to an embodiment of the present invention.

FIG. 2 shows a configuration of the machine translation system implemented by the computer system shown in FIG. 1.

FIG. 3 shows a functional configuration of a sentence segmentation module according to an embodiment of the present invention.

FIG. 4 shows a flowchart illustrating a procedure of sentence segmentation performed by the sentence segmentation module according to an embodiment of the present invention.

FIG. 5 shows an example of probabilistic part-of-speech estimation.

FIG. 6 shows the results of sentence segmentation performed on sample text according to an embodiment of the present invention.

DETAILED DESCRIPTION OF THE INVENTION

The present invention will be described below in detail with respect to an embodiment shown in the accompanying drawings. In recent natural language processing in areas such as machine translation, the dramatic improvement in the performance and memory size of computers has propelled the use of probabilistic and statistical approaches in which language models are constructed from a huge amount of language data (corpus) and applied. The present invention applies probabilistic part-of-speech estimation to sentence segmentation, in which the parts of speech of words constituting a sentence are estimated by using a probabilistic and statistical approach.

While the present invention can be applied to a wide variety of processes, such as machine translation and summarization, that require natural language analysis, the embodiment will be described with respect to sentence segmentation performed in a preliminary stage of machine translation, by way of example.

FIG. 1 shows a block diagram of an exemplary hardware configuration of a computer system suitable for implementing a machine translation system of the present embodiment. The computer system shown in FIG. 1 includes a Central Processing Unit (CPU) 101, main memory 103 connected to the CPU 101 through a Mother Board (MB) chip set 102 and a CPU bus, a video card 104 connected to the CPU 101 through the MB chip set 102 and an Accelerated Graphics Port (AGP), a hard disk 105 and a network interface 106 connected to the MB chip set 102 through a high-speed bus such as a Peripheral Component Interconnect (PCI) bus, and a floppy® disk drive 108 and a keyboard/mouse 109 connected to the MB chip set 102 through the high-speed bus, a bridge circuit 107, and a low-speed bus such as an Industry Standard Architecture (ISA) bus.

The configuration shown in FIG. 1 is only an illustrative configuration of a computer system which can implement the present embodiment. Many other system configurations to which the present embodiment can be applied may be used. For example, a video memory alone may be included instead of the video card 104 and image data may be processed in the CPU 101. Alternatively, a sound arrangement for inputting and outputting voice may be provided. Also, a drive for CD-ROM (Compact Disc Read Only Memory) or DVD-ROM (Digital Versatile Disc Read Only Memory) may be provided through the provision of an interface such as an AT attachment (ATA).

FIG. 2 shows a configuration of a machine translation system implemented by the computer system shown in FIG. 1 according to the present embodiment. Referring to FIG. 2, the machine translation system of the embodiment includes an input module 10 for inputting target text in natural language, a sentence segmentation module 20 for breaking the input text into sentences, a translation module 30 for translating the sentences, an output module 40 for outputting resulting translations, and a dictionary storage 50 used in processes performed by the sentence segmentation module 20 and translation module 30.

The input module 10, sentence segmentation module 20, translation module 30, and output module 40 in this configuration are virtual software blocks implemented by the CPU 101 under the control of a program expanded in the main memory 103 shown in FIG. 1. The program for controlling the CPU 101 to implement these functions can be stored in a magnetic disk, optical disk, semiconductor memory, or other storage media for delivery, or transmitted over a network and provided to a user. In this embodiment, the program is input through the network interface 106 or floppy® disk drive 108 shown in FIG. 1, or a CD-ROM drive (not shown) and stored in the hard disk 105. The program stored in the hard disk 105 is then loaded and expanded in the main memory 103 and executed by the CPU 101 to implement the functions of the above-described components.

The dictionary storage 50 is implemented in the hard disk 105 and main memory 103 shown in FIG. 1 and stores dictionaries referenced in processes performed by the sentence segmentation module 20 and translation module 30. In the example shown, a user dictionary 51, system basic dictionary 52, and domain dictionaries 53 are stored.

Target text is input in the input module 10, which is a component of the machine translation system of the present embodiment. In this embodiment, the target text is written in English. The target text can be input by reading the text stored in storage such as the hard disk 105 shown in FIG. 1, receiving the text over a network such as the Internet through the network interface 106, or using an input device such as the keyboard or mouse 109. The input text is stored in a cache memory of the CPU 101 or the main memory 103 shown in FIG. 1.

The sentence segmentation module 20 reads the input text stored in the cache memory of the CPU 101 or the main memory 103 and breaks it into separate sentences. In the sentence segmentation, the dictionaries 51, 52, and 53 stored in the dictionary storage 50 are referenced as appropriate. In this embodiment, probabilistic part-of-speech estimation is used to break text, which will be detailed later. Each of the sentences of the input text thus broken is stored in the cache memory of the CPU 101 or the main memory 103 shown in FIG. 1.

The translation module 30 reads each of the sentences of the input text stored in the cache memory of the CPU 101 or the main memory 103 and translates it. In this translation, dictionaries 51, 52, and 53 stored in the dictionary storage 50 are referenced as appropriate. Any of various translation methods used in conventional machine translation systems may be used for the translation performed by the translation module 30 in this embodiment.

The output module 40 outputs the result of translation performed by the translation module 30. The output of the resulting translation can be displayed on a display device through the video card 104 shown in FIG. 1. Also, it may be output to a printer or sent to another computer system over a network through the network interface 106. It may be saved in a file on the hard disk 105.

Next, sentence segmentation by the sentence segmentation module 20 according to the embodiment will be described in detail below. FIG. 3 shows a functional configuration of the sentence segmentation module 20. Referring to FIG. 3, the sentence segmentation module 20 includes a layout analyzer 21 for analyzing the layout of input text, a conventional sentence segmentation module 22 for performing conventional sentence segmentation, and a part-of-speech estimation and sentence segmentation module 23 that uses probabilistic part-of-speech estimation to perform sentence segmentation.

The layout analyzer 21 analyzes the layout of input text to extract layout information indicating the type of a paragraph. If input text is written in a markup language such as HTML, the layout analysis may be accomplished by analyzing marks (tags). If the input text is document data in application software having its own layout information, the layout analysis can be accomplished by analyzing layout information in the application software. If the input text is plain text, which does not provide any special layout information, layout information can be extracted by estimating its layout based on the presence of markers such as a line break, space, and tab.

The conventional sentence segmentation module 22 performs on input text conventional sentence segmentation performed in the prior art. That is, it references data in the dictionaries to determine whether a period in the text is a part of a period word or used as a separated, punctuation mark. If the period is used as a separated, punctuation mark, the conventional sentence segmentation module 22 breaks the text into sentences immediately after the period. If it is a part of a period word, such as "Mr.", that cannot appear at the end of a sentence, the conventional sentence segmentation module 22 does not break the text.

If the conventional sentence segmentation module 22 cannot make a break determination, that is, if the input text contains a period word that can appear at the end and at any midpoint of a sentence, the part-of-speech estimation and sentence segmentation module 23 uses probabilistic part-of-speech estimation to perform sentence segmentation. Sentence segmentation by using the probabilistic part-of-speech estimation will be described below.

First, the probabilistic part-of-speech estimation used in this embodiment will be described below. Part-of-speech estimation (part-of-speech tagging) is a process in morphological analysis for estimating the part-of-speech of each word in a text to attach information (tag) to the word.

The following two criteria are used to estimate the part-of-speech. Which of possible multiple parts of speech of a word is most likely to be its part of speech. For example, a word, "breakfast", is often used as a noun but seldom used as a verb. Priority of the order in which parts of speech appear. For example, if a word that can be a verb or noun follows an article "the", it is considered a noun by priority.

The part-of-speech estimation can be performed by using a probabilistic approach. The most probable part-of-speech sequence is determined for words in a sentence by referencing a corpus to which part-of-speech information is added and performing the above-described determination based on the appearance ratio of usages.

FIG. 5 shows an example of the probabilistic part-of-speech estimation. In the example shown in FIG. 5, the part-of-speech of each word in the text, "Time flies like an arrow" is estimated. The result (a parts of speech sequence indicated in boldface and by a thick line in the drawing) of the estimation is that "Time" is considered a noun, "flies" as a verb, "like" as a preposition, "an" as an article, and "arrow" as a noun. The method of estimating the parts of speech may be any of various existing methods, such as those using a rule base or decision tree, and any of various models, such as a hidden Markov model, may be used.

Sentence segmentation to which the above-described probabilistic part-of-speech estimation is applied will be described below. In typical text, there are various structures of sentences and even a noun phrase may be a sentence. Noun phrases are often used by themselves as titles or list items but rarely used as a sentence in typical paragraphs. In particular, in a case where it is difficult to determine whether text should be broken into two sentences immediately after a period word, the likelihood of one of the sentences being a noun phrase is very low. Therefore it can be considered that each of the sentences preceding and following the period has its main verb.

Therefore, whether text should be broken into two sentences can be determined based on whether a verb that can be a main verb is contained in the parts preceding and following the period. If only one of the parts preceding and following the period contains a main verb, the text is not broken immediately after the period. On the other hand, if both of the parts preceding and following the period contain main verbs, the text is broken into two sentences immediately after the period. For example, in the above-described sentence, "Japanese Prime Minister Junichiro Koizumi went to U.S. president Bush welcomed him", there is a verb "went" before "U.S." and a verb "welcomed" after "U.S.". Therefore, it can be determined that the text should be broken immediately after "U.S.".

English has many multi-part-of-speech words. If the parts of speech of words can be estimated by the part-of-speech estimation process, main verbs can be estimated as a general rule by using the estimation. However, a main verb in a complex sentence formed with a subordinate conjunction or a relative pronoun cannot be identified simply by searching for a verb because it contains, in addition to its main verb, a verb of a dependent clause. For example, in text, ". . . it would be much better if the U.S. Traffic Office was allowed to . . . " "U.S. Traffic Office" is in a dependent clause following "if". If the parts preceding and following the period were simply searched for a verb, "be" found in the preceding part and "was" found in the following part would be erroneously considered main verbs and the text would be broken immediately after "U.S." into two sentences.

In order to avoid such erroneous processing, the following individual algorithms are used in the present embodiment. If the word following a period word is an article or a pronoun, there should be a break immediately after the period. For example, text ". . . from L.A. We want . . . " is broken immediately after a period word, "L.A.", because a pronoun, "We", follows the period word "L.A.".

If a subordinate conjunction or a relative pronoun is found before a period word, the search for a verb is ended at the period word. For example, the text ". . . it would be much better if the U.S. Traffic Office was . . . " contains a subordinate conjunction "if" before a period word "U.S.". Therefore the search for a verb is ended at "U.S.". As a result, a verb "be" is not detected and the text is not broken immediately after "U.S.".

If a subordinate conjunction or a relative pronoun is found after a period word, the nest level of the nested structure of text is increased by one. If a verb is found after the period word, the nest level is decreased by one. Then, a verb that is found when the nest level is 0 is considered a main verb. For example, text ". . . meet Democratic U.S. Senate candidates who are young." contains a relative pronoun "who" after a period word "U.S.", therefore the nest level is increased by one. Then, the nest level is decreased by one to reset it to zero at a verb "are" following the relative pronoun "who". As a result, the verb "are" itself is not considered a main verb and therefore the text is not broken immediately after the period word "U.S.".

A verb following a conjunction "and" is not considered a main verb after a period word. For example, in text "It is the job of U.S. Traffic Office to gather traffic information and provide . . . " a verb "provide" following a conjunction "and" appears in the part after a period word "U.S.". The verb "provide" is not considered a main verb. (A verb "gather" following "to" is obviously an infinitive with "to" and therefore cannot be a main verb.) As a result, only a verb "is" found before "U.S." is considered a main verb. Therefore, the text is not broken immediately after the period word "U.S.".

If these algorithms are applied to the above-provided text, ". . . it would be much better if the U.S. Traffic Office was allowed to . . . " then, according to the second algorithm, it is not broken immediately after "U.S." because a subordinate conjunction "if" is found before the period word "U.S." . The four algorithms are independent of each other and can be applied in any order. Also, it is not required that all of the four algorithms be applied. Using these algorithms in a mutually supplementing manner can improve the accuracy of the determination whether text should be broken or not.

Verbs such as "be" or "have" in a present progressive, present perfect, or passive voice sentences are considered main verbs and verbs that end with "-ing" or "-ed" are not considered main verbs.

FIG. 4 shows a flowchart illustrating a procedure of sentence segmentation performed by the sentence segmentation module 20. While input text in the example shown in FIG. 4 is HTML or plain text (simply indicated as "text" in the flowchart), the process can be applied to any text data, including document data of a given application software. The sentence segmentation module 20 reads input text stored in a cache memory of the CPU 101 or the main memory 103 (step 401). Then, the layout analyzer 21 analyzes the layout of the input text. If the input text is plain text, it analyzes the layout of the text based on markers such as a line break (steps 402 and 403). If the input text is HTML text, it analyzes the layout of the text by analyzing tags (steps S402 and S404). Layout information obtained from the layout analysis is stored in the cache memory of the CPU 101 or the main memory 103.

Then, the conventional sentence segmentation module 22 and the part-of-speech estimation and sentence segmentation module 23 will start sentence segmentation of the analyzed input text. The sentence segmentation is performed sequentially on a paragraph basis, starting with the beginning of the input text.

The conventional sentence segmentation module 22 first reads the layout information obtained through the layout analysis from the cache memory of the CPU 101 or the main memory 103 and, based on the layout information, determines whether a paragraph of interest is an ordinary paragraph (step 405). If the paragraph is an ordinary one, it identifies a period used by itself and a period word that cannot appear at the end of a sentence and performs conventional sentence segmentation (step 406). The input text having undergone the text breaking is stored in the cache memory of the CPU 101 or the main memory 103.

Then, the part-of-speech estimating and sentence segmentation module 23 reads the input text having undergone the text breaking by the conventional sentence segmentation module 22 from the cache memory of the CPU 101 or the main memory 103 and uses the probabilistic part-of-speech estimation as described earlier to determine whether a period word that can appear at the end or at any midpoints of a sentence is at the end or a midpoint of a sentence. Here, the four algorithms may be used as described above. It then performs sentence segmentation based on the result of the determination (step 407) and outputs the text broken into sentences resulting from the process (step 409).

On the other hand, if it is determined at step 405 that the paragraph is not an ordinary one, the conventional sentence segmentation module 22 performs conventional sentence segmentation (step 408), then outputs the text broken into sentences without performing a process by the part-of-speech estimation and sentence segmentation module 23 (step 409).

An example of the result of sentence segmentation according to the present embodiment will be described below. In this example, part-of-speech estimation based on a hidden Markov model is used as a probabilistic model for part-of-speech estimation (part-of-speech tagging). A hidden Markov model is an automaton that provides probabilistic state transition and probabilistic symbol outputs.

Parameters of the model can be calculated from a tagged corpus (a corpus to which part-of-speech information is added). The parameters calculated can be used together with a Viterbi algorithm to determine a parts of speech sequence that is most likely to be the one for a given input word string. The hidden Markov model is detailed in a document entitled, "A practical part-of-Speech Tagger" (by Cutting, D., Kupiec, J., Pedersen, J., and Sibun, P., in proceedings of the Third Conference on Applied Natural Language Processing, Trento, Italy, April 1992).

The present embodiment was applied to 179 text samples (30 two-sentence samples and 149 single-sentence samples) that contained period words immediately after which samples were allowed to or not allowed to be broken. FIG. 6 shows a table indicating the results. Indicated in the "Process 1" column in the table are the results of a process in which probabilistic part-of-speech estimation and the four algorithms described above were used. Indicated in the "Process 2" column are the results of a process in which only probabilistic part-of-speech estimation was used. In the conventional method given in the table for comparison with these processes, samples were broken immediately after period words that can appear at the end or any midpoint of a sentence.

Referring to FIG. 6, in process 1, all the two-sentence samples were correctly broken into two sentences and 136 of 149 single-sentence samples were not broken. In process 2, 27 of 30 two-sentence samples were correctly broken into two sentences and 127 of 140 single-sentence samples were not broken. The conventional process provided correct results for all the two-sentence samples because it breaks any samples into sentences immediately after period words that can appear at the ends or at any midpoints of sentences. However, it provided erroneous results for all the single-sentence samples.

Comparison among these processes shows that the present embodiment provided a significantly higher accuracy than the conventional process. Furthermore, comparison between process 1 and process 2 shows that process 1, in which the four algorithms were applied, provided higher accuracy.

While the present embodiment has been described, by way of example, with respect to sentence segmentation performed as a preliminary process for machine translation, the embodiment can be applied to any natural language processing, such as summarization, without modification because it concerns sentence segmentation alone. Furthermore, because the percentage of time required for morphological analysis to time required for typical natural language processing in its entirety is considerably small, the part-of-speech estimation in the sentence segmentation of the embodiment performed in a preliminary stage does not remarkably delay the processing and is therefore sufficiently practical.

While the example has been described in which input text is written in English and part-of-speech estimation is performed to determine whether the text should be broken immediately after a period in the text, the method of the present embodiment can be applied to other languages such as German or French to determine whether text should be broken immediately after a period in the text. Furthermore, if it cannot be determined whether text in natural language should be broken into sentences simply by referencing a dictionary, results of the above-described part-of-speech estimation can be used in combination with the dictionary to improve the accuracy of sentence segmentation.

As described above, according to the present invention, highly accurate sentence segmentation can be provided by estimating the parts of speech of words in text to be processed.

What is claimed is:

1. A sentence segmentation method of using a computer to break text in a natural language into sentences, comprising the steps of:

inputting the text to be processed, breaking the text into sentences through the use of dictionary data stored in a dictionary storage, and storing the broken text in memory; and reading said text to be processed from said memory, estimating the part of speech of a word constituting said text, and performing sentence segmentation processing on said text based on the result of the part-of-speech estimation;

wherein said sentence segmentation processing comprises determining whether said text should be broken, depending on a positional relationship between a word containing a period and a main verb in said text, said word and said main verb being determined based on the result of said part-of-speech estimation;

wherein said sentence segmentation processing further comprises determining whether a verb should be treated as a main verb, based on the positional relationship between a subordinate conjunction or a relative pronoun and said verb in said text.

2. The sentence segmentation method according to claim 1, wherein said step of performing sentence segmentation processing based on the result of said part-of-speech estimation comprises the step of determining that a verb following a conjunction "and" found at a point after said word containing the period is not a main verb.

3. The sentence segmentation method according to claim 1, wherein said step of performing the sentence segmentation based on the result of said part-of-speech estimation comprises the step of determining that said text should be broken by the period if an article or pronoun is found immediately after the word containing the period in said text based on the result of said part-of-speech estimation.

4. A sentence segmentation method of using a computer to break text in natural language into sentences, comprising the steps of:

inputting the text to be processed, estimating the part of speech of a word constituting said text, and storing the result of said part-of-speech estimation in memory; and if it is determined that there are verbs before and after a word containing a period in the text based on the result of said part-of-speech estimation that is stored in said memory, breaking the text into sentences by said period.

wherein the text to be processed is input, the layout of said text is analyzed, and obtained layout information is stored in memory;

wherein part-of-speech estimation and segmentation based on the result of said part-of-speech estimation are performed on text constituting an ordinary paragraph, said ordinary paragraph being determined based on said layout information stored in said memory.

5. The sentence segmentation method according to claim 4, wherein a probabilistic method based on a corpus to which information about the parts of speech of words is added is used to estimate the part of speech of the word in said text to be processed.

6. A sentence segmentation apparatus for performing a process for breaking text in natural language into sentences in natural language processing, comprising:

a dictionary storage in which dictionary data is stored;

a first sentence segmentation module for breaking the text input as a target of the processing into sentences based on said dictionary data;

a second sentence segmentation module for estimating the part of speech of a word constituting said text and breaking said text into sentences if said first sentence segmentation module cannot determine whether said text should be broken into sentences; and a layout analyzer for analyzing the layout of the text input as a target of the processing, wherein said second sentence segmentation module performs sentence segmentation on text determined as constituting an ordinary paragraph based on the result of the analysis performed by said layout analyzer.

7. The sentence segmentation apparatus according to claim 6, wherein said second sentence segmentation module determines based on positional relationship between a word containing a period and a main verb whether the text should be broken into sentences by the period.

8. A sentence segmentation method of using a computer to break text in a natural language into sentences, comprising the steps of: inputting the text to be processed, breaking the text into sentences through the use of dictionary data stored in a dictionary storage, and storing the broken text in memory; and reading said text to be processed from said memory, estimating the part of speech of a word constituting said text, and performing sentence segmentation processing on said text based on the result of the part-of-speech estimation;

wherein said sentence segmentation processing comprises determining whether said text should be broken, depending on positional relationship between a word containing a period and a main verb in said text, said word and said main verb are determined based on the result of said part-of-speech estimation;

wherein said sentence segmentation processing further comprises the step of determining that a verb following a conjunction "and" found at a point after said word containing the period is not a main verb.

* * * * *